United States Patent
Huebsch et al.

(10) Patent No.: US 6,742,092 B1
(45) Date of Patent: *May 25, 2004

(54) SYSTEM AND METHOD FOR BACKING UP DATA FROM A PLURALITY OF CLIENT COMPUTER SYSTEMS USING A SERVER COMPUTER INCLUDING A PLURALITY OF PROCESSES

(75) Inventors: Richard J. Huebsch, Hudson, WI (US); Robert J. Prieve, Shoreview, MN (US); Leonard Kampa, Blaine, MN (US)

(73) Assignee: Veritas Operating Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/263,442

(22) Filed: Oct. 2, 2002

Related U.S. Application Data

(63) Continuation of application No. 08/755,004, filed on Nov. 22, 1996, now Pat. No. 6,487,644.

(51) Int. Cl.[7] ............................................. G06F 12/16
(52) U.S. Cl. ........................................ 711/162; 711/4
(58) Field of Search ................. 711/161, 162, 711/4

(56) References Cited

U.S. PATENT DOCUMENTS

| | | | | |
|---|---|---|---|---|
| 5,133,065 A | * | 7/1992 | Cheffetz et al. ............ | 714/2 |
| 5,212,772 A | * | 5/1993 | Masters ...................... | 714/20 |
| 5,379,292 A | * | 1/1995 | Kurata et al. ............... | 370/216 |
| 5,546,534 A | | 8/1996 | Malcolm ..................... | 714/6 |
| 5,574,906 A | | 11/1996 | Morris ........................ | 707/1 |
| 5,634,052 A | * | 5/1997 | Morris ........................ | 711/162 |
| 5,673,381 A | * | 9/1997 | Huai et al. .................. | 711/162 |
| 5,751,997 A | * | 5/1998 | Kullick et al. .............. | 711/162 |
| 5,778,395 A | * | 7/1998 | Whiting ...................... | 707/204 |
| 5,950,218 A | * | 9/1999 | Howard ....................... | 711/4 |
| 6,487,644 B1 | * | 11/2002 | Huebsch et al. ............ | 711/162 |

\* cited by examiner

*Primary Examiner*—Glenn Gossage
(74) *Attorney, Agent, or Firm*—Meyertons Hood Kivlin Kowert & Goetzel, P.C.; B. Noël Kivlin

(57) ABSTRACT

A system and method for backing up data from a plurality of client computer systems. A server computer executes a plurality of processes each configured to receives back-up data from a respective one of the client computers. Each of the processes stores the back-up data into a buffer within a shared memory area. The server computer associates an identification tag with each set of back-up data which identifies from which particular client computer the data was received. The server computer then stores the back-up data and the identification tags within a storage unit. Data from a particular client is de-multiplexed from the storage unit by scanning all of the identification tags in the storage unit and sending any data which is associated with a received identification tag to the particular client.

26 Claims, 10 Drawing Sheets

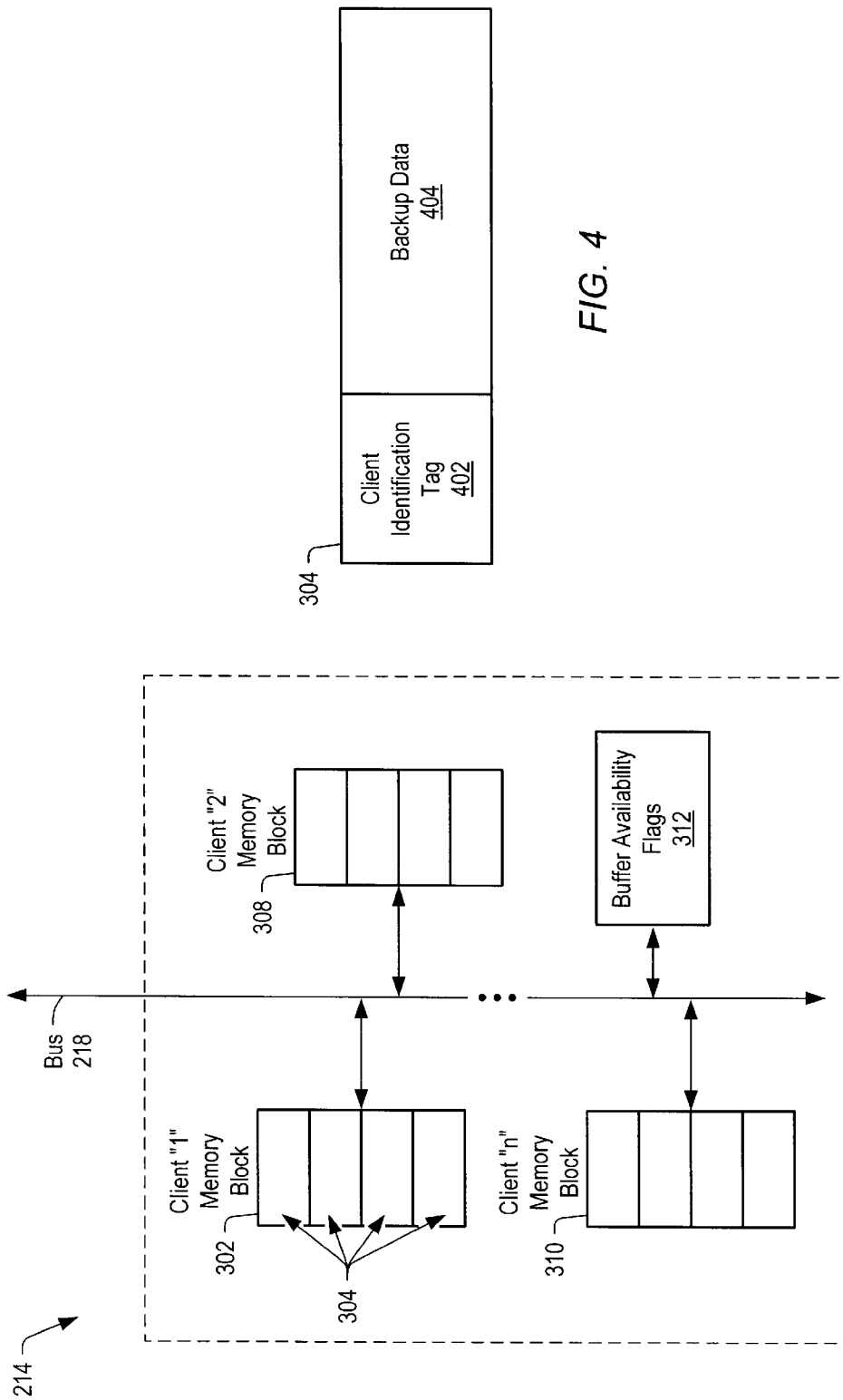

SYSTEM AND METHOD FOR BACKING UP DATA FROM A PLURALITY OF CLIENT COMPUTER SYSTEMS USING A SERVER COMPUTER INCLUDING A PLURALITY OF PROCESSES

This application is a continuation application of U.S. patent application Ser. No. 08/755,004, filed Nov. 22, 1996, now U.S. Pat. No. 6,487,644.

BACKGROUND OF THE INVENTION

1. Field of the Invention

The present invention relates generally to systems and methods for enterprise data management and more particularly, to multiplexing back-up data from several sources onto a single storage device.

2. Description of the Background Art

Networked client/server computer systems are becoming increasingly more common as the "Information Revolution" progresses. In a client/server computer network, the server computer is a computer that runs a set of services which are available to the client computers. The client computers are computers that run application programs through which the services are requested. The client computers and server computers are inter-coupled via a network. Such services may include database management, Network Information Services (NIS), and Network File System (NFS) programs. The services may operate within an environment that includes a back-up process. A back-up process copies data from an expensive disk storage media to a much less expensive tape storage media so as to provide a back-up copy of the data.

Typically when client computer data is backed-up by a server computer, the server computer backs-up client computer data to tapes in a serial manner, that is, one client computer at a time. This means that the server computer schedules a tape drive resource for backing-up a particular client computer's data, and the tape drive is dedicated solely to that client computer until the client computer stops sending back-up data. In this manner, the back-up data are written to tape in a standardized format. One such standardized format is provided by the Tape ARchive™ function of the UNIX® (a registered trademark of Novell, Inc. of Orem, Utah) operating system.

Dedicating such a resource to a single client computer during a back-up operation often does not fully utilize a tape drive's data through-put capabilities and results in poor use of a critical resource. Therefore, what is needed is a system and method for keeping enough data available so that that a tape drive's full through-put capabilities may be most completely realized.

SUMMARY OF THE INVENTION

The present invention is a system and method for multiplexed data back-up. Within the apparatus of the present invention, a back-up tape manager performs the actual multiplexed data back-up through use of multiple reading processes, a writing process, and a de-multiplexing process. The reading processes monitor the network for back-up data packets from individual client computers and inserts the data into a buffer within a shared memory area. The writing process multiplexes each client computer's back-up data from the buffers in the shared memory with the back-up data from the other client computers onto a tape. The de-multiplexing process receives requests to retrieve data from a particular client computer that has been backed-up onto a tape and scans through the tape, copying only those sets of back-up data corresponding to that particular client computer. The de-multiplexing process reunites individual sets of back-up data from the tape into a single complete client computer data stream. An additional back-up scheduler unit enables the entire multiplexed data back-up process to be tailored to the performance capabilities of an individual set of client/server computer network resources.

Within the method of the present invention, a server computer receives back-up data over a network from a client computer. The server computer routes the back-up data to an empty buffer within a shared memory area where it attaches a client identification tag to the back-up data. The server computer then scans all of the buffers within the shared memory searching for any full buffers. If a full buffer is found, the server computer copies the client identification tag and the back-up data from the buffer onto a tape in the order in which the buffers fill up regardless of which client computer their data came from.

The back-up data is de-multiplexed in response to a user selecting a file to be retrieved from a back-up image corresponding to a client computer. A client identification tag corresponding to the file is then identified. In response, the server computer scans all the client identification tags from within a set of multiplexed data stored on a source tape. When a client identification tag is found to correspond to the identified client identification tag, the server computer transmits the data block associated with that client identification tag back to the requesting user. Alternatively, data can be de-multiplexed in response to a user command when making a duplicate copy of the source tape.

According to the apparatus and the method described, back-up data may be received from a plurality of client computers and multiplexed onto a single tape drive. In this manner not only may the tape drive resources be used to their fullest capacity, but also client computers need not wait for other client computers to complete their data back-up before they can begin their own.

BRIEF DESCRIPTION OF THE DRAWINGS

FIG. 3 is a block diagram of a shared memory within the server computer of FIG. 2;

FIG. 4 is a block diagram of a data structure for a buffer within a memory block;

DETAILED DESCRIPTION OF THE PREFERRED EMBODIMENT

Figure 1:
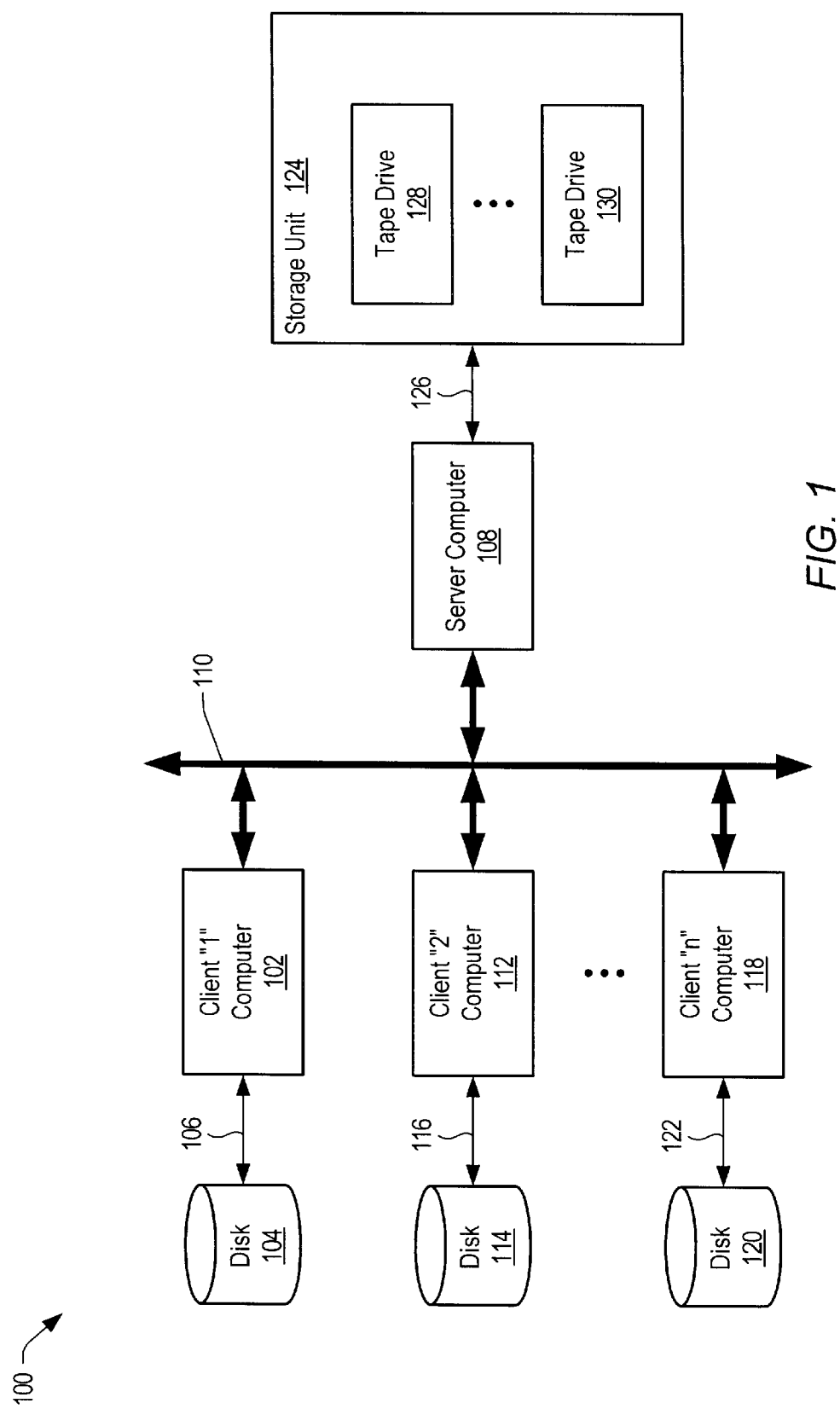
FIG. 1 is a block diagram of a system that multiplexes storage of back-up data.

FIG. 1 is a block diagram of a system 100 that multiplexes storage of back-up data. The system 100 includes client computers 102, 112, 118 and disks 104, 114, 120, respectively coupled by buses 106, 116, 122. The system 100 further includes a server computer 108 coupled to the client computers 102, 112, 118 via a network 110. Those skilled in the art will recognize that the present invention may be implemented on non-network computer systems also. The server computer 108 is coupled via bus 126 to storage unit 124. The storage unit 124 includes tape drives 128, 130 which are also coupled to bus 126.

The buses 106, 116, 122, 126 conform to Small Computer System Interface (SCSI) parallel interface standards (also known as ANSI X3T9.2). The network 110 conforms to ISO/OSI (International Standards Organization/Open System Interconnection) standards and Transmission Control Protocol/Internet Protocol (TCP/IP) standards.

The client computers 102, 112, 118 may contain one of several operating systems, such as Windows NT® (a registered trademark of Microsoft Inc. of Redmond, Wash.), Mac® (a registered trademark of Apple Computer, Inc. of Cupertino, Calif.), NetWare® (a registered trademark of Novell, Inc. of Orem, Utah) or UNIX®.

Each client computer 102, 112, 118 has a BacK-up ARchive (BKAR) process (not shown) for reading data from its disk 104, 114, 120 and sending the data across the network 110 to the server computer 108. The data sent from a client computer to a server computer for back-up is referred to as "back-up data." The server computer writes the back-up data into the storage unit 124.

The server computer 108 is comparable in capabilities to a SPARCcenter 2000™ machines, manufactured by Sun Microsystems of Mountain View, Calif. The SPARCcenter 2000™ machines run Solarise (a registered trademark of Sun Microsystems, Inc. of Mountain View. Calif.), a UNIX® based multitasking operating system available from SunSoft Corp. Those skilled in the art will recognize that various platforms from other vendors, such as Windows NT®, are also acceptable.

The server computer 108 contains processes for concurrently receiving back-up data from the client computers 102, 112, 118 and multiplexing the back-up data onto the tape drives within the storage unit 124 at the highest rate of speed that the storage unit 124 can handle. The multiple data streams also enable the BKAR process within the client computers to take advantage of any extra server computer 108 capacity or network 110 bandwidth that may be available. The server computer 108 is further discussed with reference to FIG. 2.

The storage unit 124 is a conventional non-volatile information storage device, such as a tape stacker, a tape library, a tape carousel, a robotics device or an optical jukebox. While "tape" is the storage medium discussed throughout this specification, those skilled in the art recognize that other storage media may be used. The storage unit 124 includes a set of tape drives 128, 130 each available for reading and writing a tape inserted therein. Preferably the number of tape drives 128, 130 may range from as few as one to as many as 10 or more.

Figure 2:
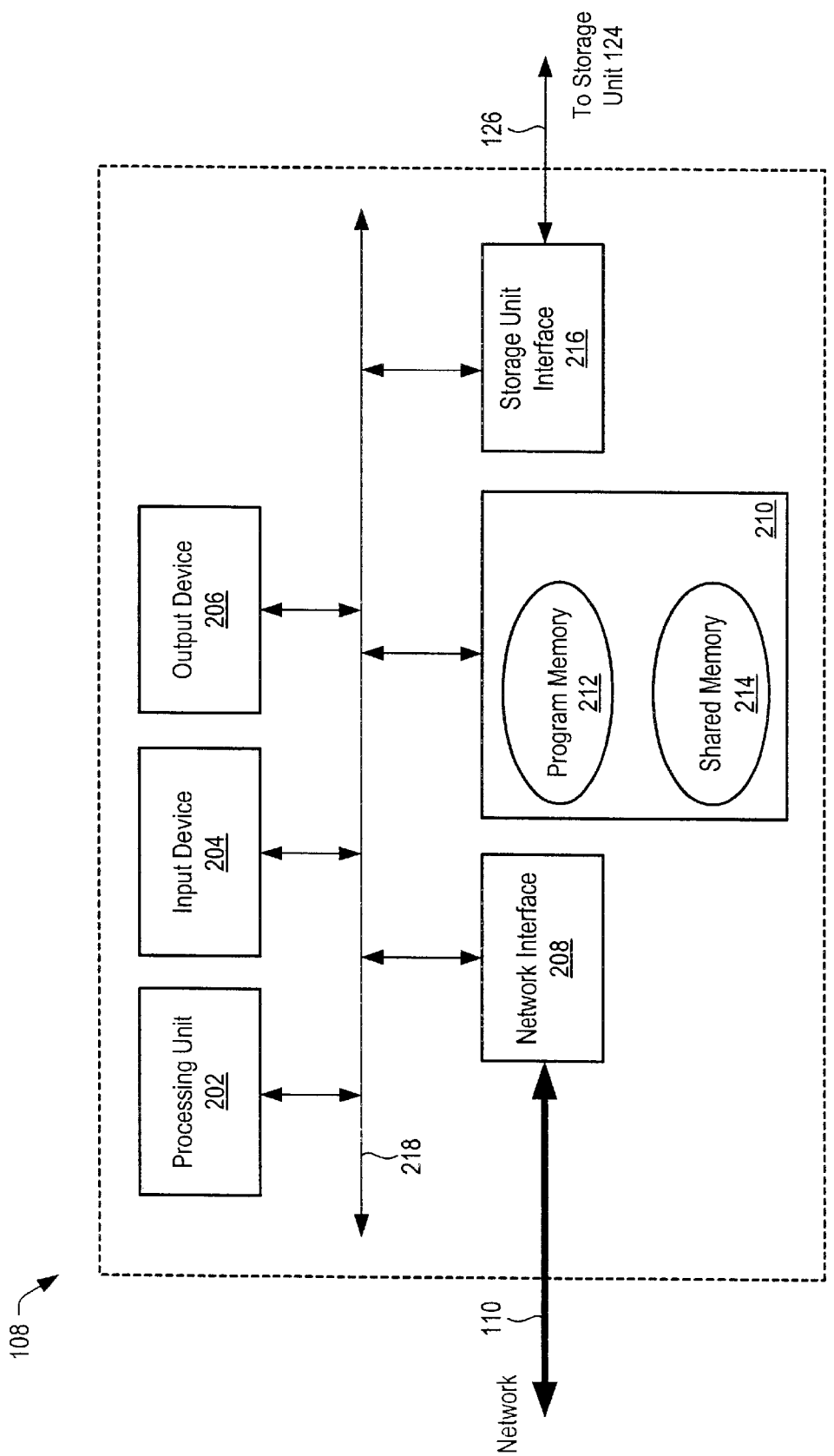
FIG. 2 is a block diagram of a server computer.

FIG. 2 is a block diagram of a server computer 108. The server computer 108 includes a processing unit 202, an input device 204, an output device 206, a network interface 208, an internal memory 210, and a storage unit interface 216, each coupled via a bus 218. The internal memory 210 includes a program memory 212 and a shared memory 214. Additionally, the network interface 208 is coupled to the network 110 and the storage unit interface 216 is coupled to the bus 126.

Elements 202, 204, 206, 208, and 216 are conventionally known. However within the internal memory 210, the program memory 212 contains program instructions which are not conventionally known and the shared memory 214 contains data structures which are also not conventionally known.

The processing unit 202 executes program instructions which are read from the program memory 212. The input device 204 includes a keyboard and/or mouse for input of commands and data to the processing unit 202. The output device 206 is a display monitor for displaying information received from the processing unit 202. The network interface 208 provides the server computer 108 with a communications link with the client computers 102, 112, 118 over the network 110. The network interface 208 includes a hardware interface, generally implemented as a Network Interface Card (NIC), which is not shown. The NIC provides necessary signal translation between the server computer 108 and the network 110. The storage unit interface 216 preferably provides an interface for routing data to and receiving data from the storage unit 124.

The program memory 212 stores computer readable program instructions for controlling how the processing unit 202 accesses, transforms, and outputs data, as described in detail below with reference to FIG. 5. The program memory 212 preferably comprises both a volatile and a non-volatile portion. Those skilled in the art will recognize that in alternate embodiments the program memory 212 could be supplemented with other computer useable mediums, including a compact disk, a hard drive or a memory card.

The shared memory 214 provides a set of memory buffers for storing back-up data received from the client computers 102, 112, 118. During back-ups, each client computer 102, 112, 118 is preferably assigned its own dedicated memory buffer area within the shared memory 214. The shared memory 214 is also used for exchanging data between multiple processes stored within the program memory 212.

FIG. 3 is a block diagram of the shared memory 214 within the server computer 108 of FIG. 2. The shared memory 214 stores a set of memory blocks 302, 308, 310 and a set of buffer availability flags 312. Each memory block is dedicated to a respective client computer from which the server computer 108 is configured to receive back-up data. Thus, client "1" computer memory block 302 is dedicated to receive back-up data only from the client "1" computer 102; client "2" computer memory block 308 is dedicated to receive back-up data only from the client "2" computer 112; and client "n" computer memory block 310 is dedicated to receive back-up data only from the client "n" computer 118. In the preferred embodiment, each memory block 302, 308, 310 consists of four 64 Kbyte buffers 304 for a total of 256 Kbytes of memory. However, a user may reconfigure the size and number of buffers 304 within the memory blocks 302, 308, 310. The buffer availability flags 312 indicate which buffers 304 in blocks 302, 308, 310 contain new data. If a buffer availability flag 304 is set to "empty," then there is no new back-up data in that particular buffer. If the buffer availability flag 304 is set to "full," then there is new back-up data in that buffer.

FIG. 4 is a block diagram of a data structure for a buffer 304 within the memory block 302 of FIG. 3. The buffer 304 stores a client identification (ID) tag 402 for identifying the client computer 102, 112, 118 with which back-up data 404 is associated. In the case where each buffer 304 is 64K in size, the client identification (ID) tag 402 is preferably allotted 0.5 Kbytes of memory and the back-up data 404 is allotted 63.5 Kbytes of memory. Each buffer 304 temporarily stores the data received from one of the client computers 102, 112, 118 over the network 110.

Figure 5:
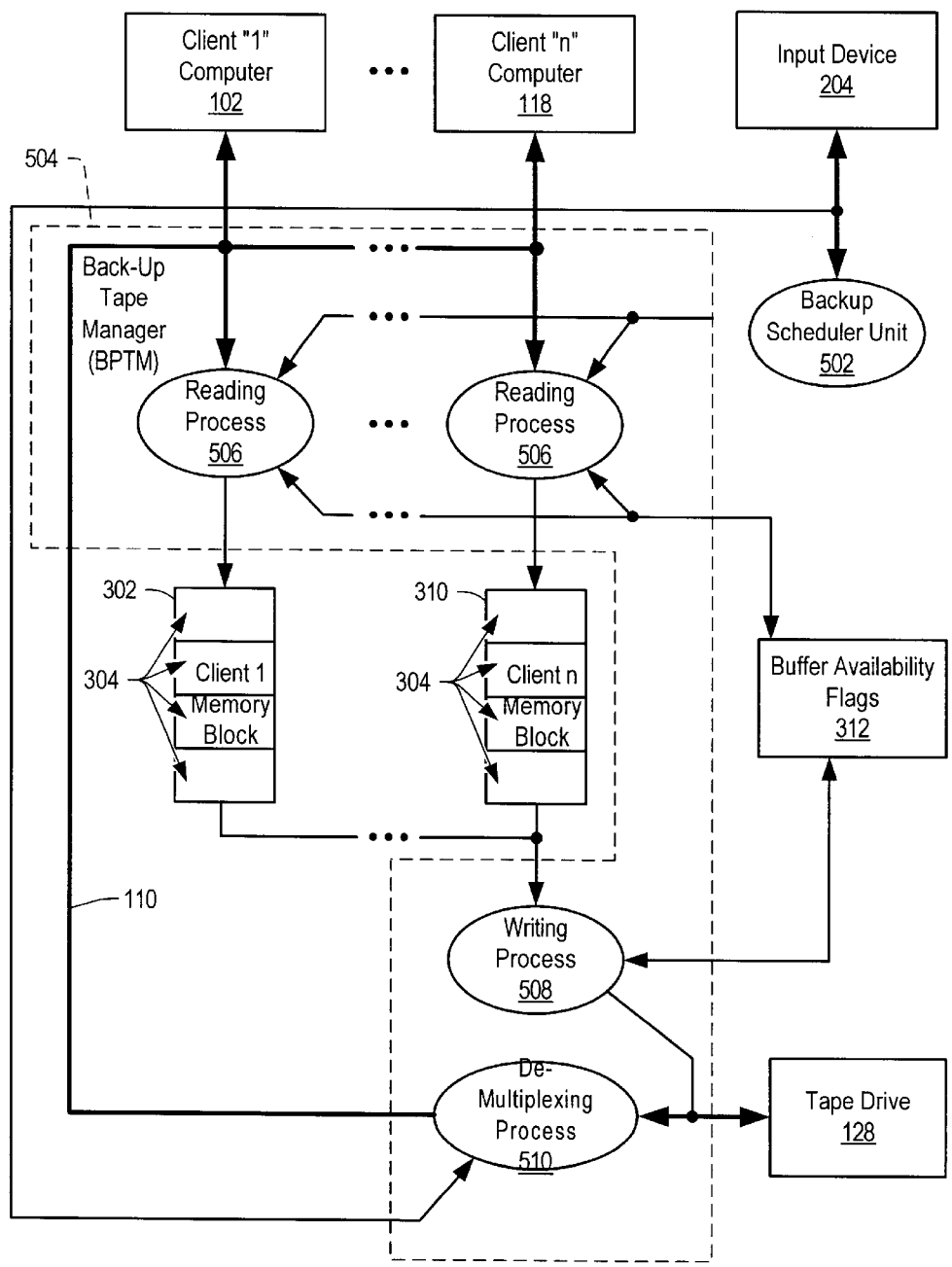
FIG. 5 is a dataflow diagram of the system of FIG. 1.

FIG. 5 is a dataflow diagram of the system 100 of FIG. 1. A back-up scheduler unit 502, a back-up tape manager (BPTM) 504 and an operating system are stored in the program memory 212. The operating system is preferably either a UNIX® or Windows NT® based multitasking operating system, for providing network services and controlling the configuration and usage of the server computer's (e.g., 108) hardware and software resources according to the programs stored in the back-up scheduler unit 502 and the BPTM 504.

The back-up scheduler unit 502 tailors the multiplexed data back-up process to the performance capabilities of an individual set of client/server computer resources. Preferably at least the following four parameters are configurable. The first parameter is a maximum number of client computer's 102, 112, 118 having data which can be backed-up and multiplexed onto any single tape drive 128, 130 within the storage unit 124. This parameter is set based on the server computer's 108 ability to handle concurrent jobs. Each client computer 102, 112, 118 requiring that its data be backed-up by the server computer 108 is defined by the server computer 108 as a "job."

The second parameter is a maximum number of jobs from a given schedule that can be multiplexed onto any one drive. This value is set individually for each schedule within a class. A "class" is a collection of client computers with similar back-up needs. A "schedule" defines how the client computer is to be backed-up (i.e. a full-back-up or an incremental-back-up) and how many jobs it may be associated with. Each class has a set of back-up "schedules" associated with it. Thus, a client computer back-up job corresponds to a "client computer" and "schedule" within a given "class." A single drive may accept jobs from different schedules so long as the maximum number of client computers 102, 112, 118 backed-up per tape drive 128, 130 is not exceeded.

The third parameter is a maximum number of jobs that may be run concurrently for any given class. The fourth parameter is a maximum number of client computer 102, 112, 118 back-up jobs that may be concurrently run from any single client computer 102, 112, 118. While a preferred set of configuration parameters have been discussed, those skilled in the art will be aware of other parameters that need to be configured.

The back-up tape manager (BPTM) 504 is comprised of multiple reading processes 506, a writing process 508, and a de-multiplexing process 510. In the preferred embodiment, the server computer 108 creates one reading process for receiving back-up data from each of the client computers 102, 112, 118. Thus if there are three client computers, the server will create three reading processes. These reading processes 506 preferably operate concurrently. Each reading process monitors the network 110 for back-up data packets from the reading process's assigned client computer 102, 112, 118 and inserts the data into a next available circular buffer within the client computer's assigned memory block 302, 308, 310. For example, if a reading process identifies a data packet from the client "1" computer 102, then the reading process looks within the client "1" memory block 302 for a buffer availability flag within the buffer availability flags 312 set to "empty." When an "empty" buffer is found, the reading process creates a client ID tag 402 for the data packet, asks the network to place the data packet into the memory buffer, and sets the buffer availability flag to "full."

The writing process 508 is in communication with the reading processes 506 and copies each client computer's 102, 112, 118 back-up data from its dedicated memory block 302, 308, 310 buffer to be multiplexed with data from the other client computers onto a tape within one of the tape drives 128, 130. First, the writing process 508 requests that the back-up scheduler unit 502 assign a tape drive 128, 130 for receiving a new set of back-up data. Next, the writing process 508 writes a "tape header" and a "client back-up header" corresponding to the client computer 102, 112, 118 from which the back-up data in the memory block 302, 308, 310 is to be received. The "tape header" initializes a blank tape with a set of conventional tape drive information. The "client back-up header" indicates that back-up data for a particular client computer exists on this particular tape. Next, the writing process 508 scans through all of the buffers within each of the memory blocks 302, 308, 310 looking for buffer availability flags which are set to "full." Upon finding a "full" buffer, the writing process 508 copies the client ID tag 402 and the back-up data 404 from the memory block's 302, 308, 310 buffer onto the tape in one of the tape drives 128, 130. After the data has been copied to tape, the writing process 508 sets the buffer availability flag to "empty" and resumes scanning for other buffers with their buffer availability flags set to "full." Since the writing process 508 just copies to tape data from whichever buffers happen to be "full," the back-up data from any one client computer may be randomly distributed throughout the tape and intermixed with back-up data from all of the other client computers that the server computer 108 services. If a buffer is in the process of being filled by the reading process 506, the server computer 108 preferably does not wait for the buffer to be filled, rather the server computer 108 keeps skipping onto a next buffer which may already be full of data to be backed-up.

During the course of the multiplexing process, new client computers may have their data scheduled to be backed-up to tape. In such a case, the back-up scheduler unit 502 determines if any configuration parameters might be violated by adding the new client computer to the back-up schema. If none of the configuration parameters would be violated, the back-up scheduler unit 502 initiates a new client computer to transmit its back-up data to the server computer 108. The BPTM 504 also sets aside a new memory block and creates a new reading process 506 for the new client computer. The writing process 508 writes a new "client back-up header" to the tape and writes new client computer's back-up data to tape in the same manner as discussed above.

The de-multiplexing process 510 processes requests to retrieve back-up data that has been multiplexed on a source tape. To begin, a user selects a backed-up file to either be restored to a client computer 102, 112, 118 via the network 110 or to be duplicated onto a destination tape. The client computer's 102, 112, 118 client identification tag is then identified and passed to the de-multiplexing process 510. Next, the de-multiplexing process 510 reads the tape looking at the client ID tag within each set of multiplexed data on the source tape. If the client ID tag within the set of multiplexed data matches the chosen client ID tag, the de-multiplexing process 510 discards the client ID tag from the set of multiplexed data and either transmits the remaining data block to the requesting client computer 102, 112, 118 or writes the data block to a destination tape. The resulting image produced is a completely restored copy of the file. Preferably the restored image is in a TAR format.

Figure 6:
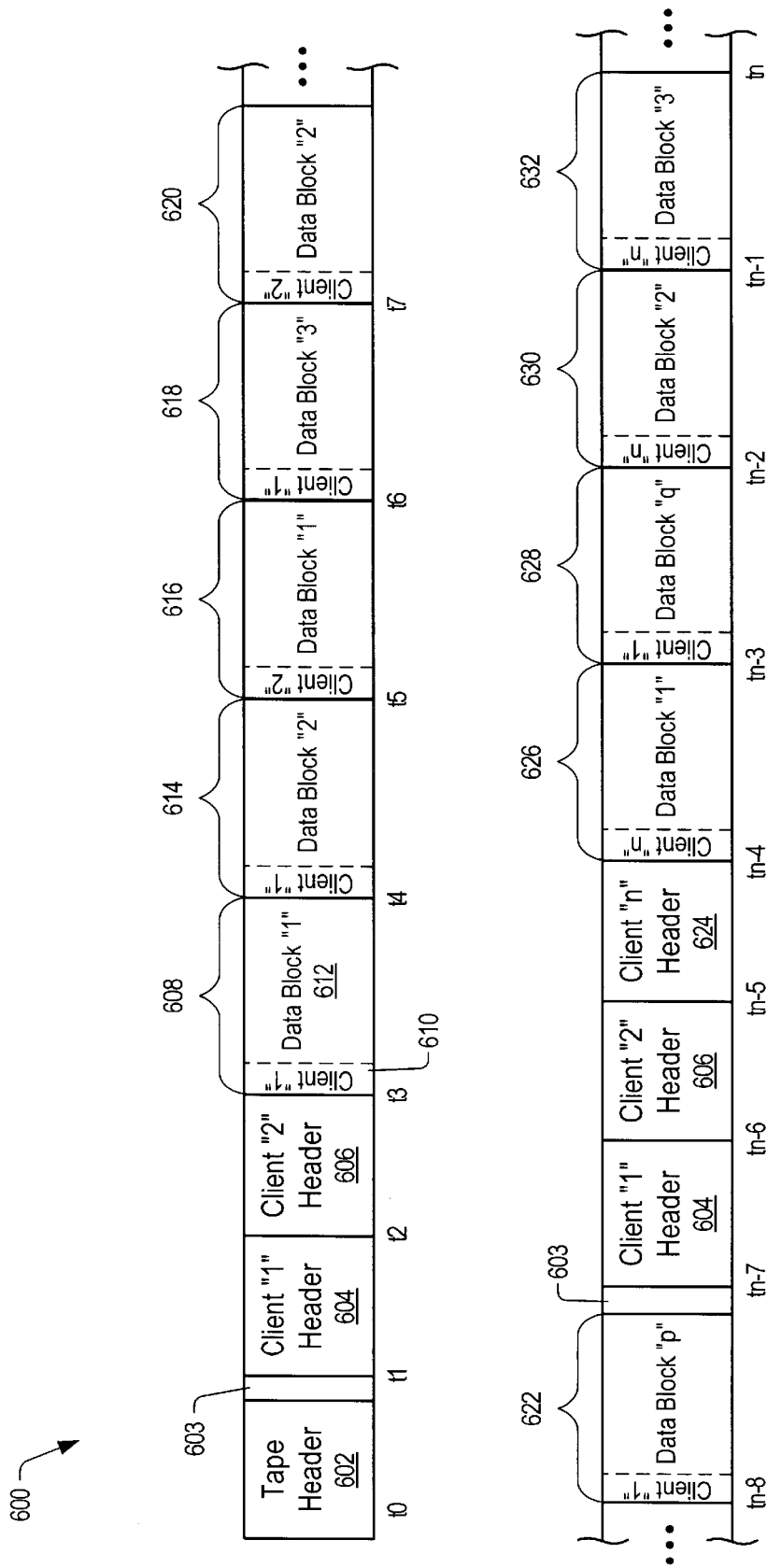
FIG. 6 is a block diagram of a data format for multiplexing back-up data to tape.

FIG. 6 is a block diagram of a data format 600 for multiplexing back-up data to tape. The data format 600 is comprised of a tape header 602, a tape mark 603, client (back-up headers 604, 606, 624 and multiplexed data entries 608, 614, 616, 618, 620, 622, 626, 628, 630, 632. Each multiplexed data entry includes a client ID tag 610 and a data block 612. In the example tape shown in FIG. 6, from time $t_0$ through $t_{n-7}$ only back-up data from the client "1" computer 102 and the client "2" computer 112 was being received and multiplexed to tape. Of that data, the client "1" computer 102 had several back-up data entries 608, 614, 618, 622 written to the tape, and the client "2" computer 112 had several back-up data entries 616, 620 written to tape. Then at time $t_{n-7}$ client "n" computer 118 started to back-up its data to tape. As a result, the tape mark 603 and client back-up headers 604, 606, 624 were written to tape. Subsequently, the client "n" computer 118 stored three back-up data entries 626, 630, 632 to tape, while client "1" computer 102 stored back-up data entry 628.

Figure 7:
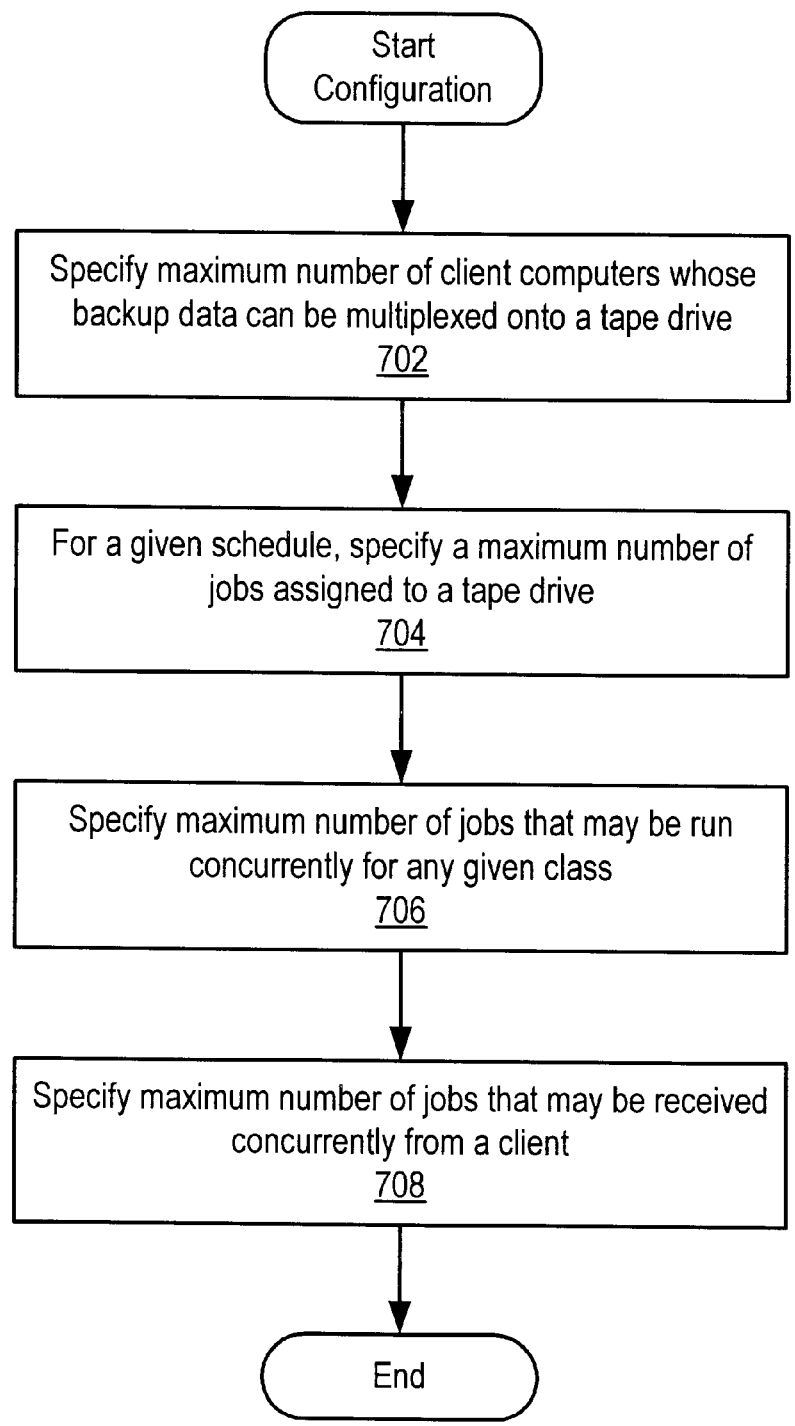
FIG. 7 is a flowchart of a method for configuring the server computer for multiplexed data back-up.

FIG. 7 is a flowchart of a method for configuring the server computer 108 for multiplexed data back-up. The method begins in step 702 where a user commands the back-up scheduler unit 502 to limit the number of client computers whose back-up data can be multiplexed onto a single tape drive 128, 130. Next, in step 704, a user commands the back-up scheduler unit 502 to limit the number of jobs assigned to a tape drive 128, 130 for a given schedule. For example, if tape drive 128 already has four active jobs, and client computer's 102 schedule has a limit of at most four jobs that it may be backed-up together with, then the client computer 102 can not be added to the multiplexing for tape drive 128.

In step 706, a user commands the back-up scheduler unit 502 to limit the number of jobs that may be run concurrently for any given class. In step 708, a user commands the back-up scheduler unit 502 to limit the number of back-up jobs that may be received from a single client computer. After step 708 the preferred method of configuration ends.

Figure 8:
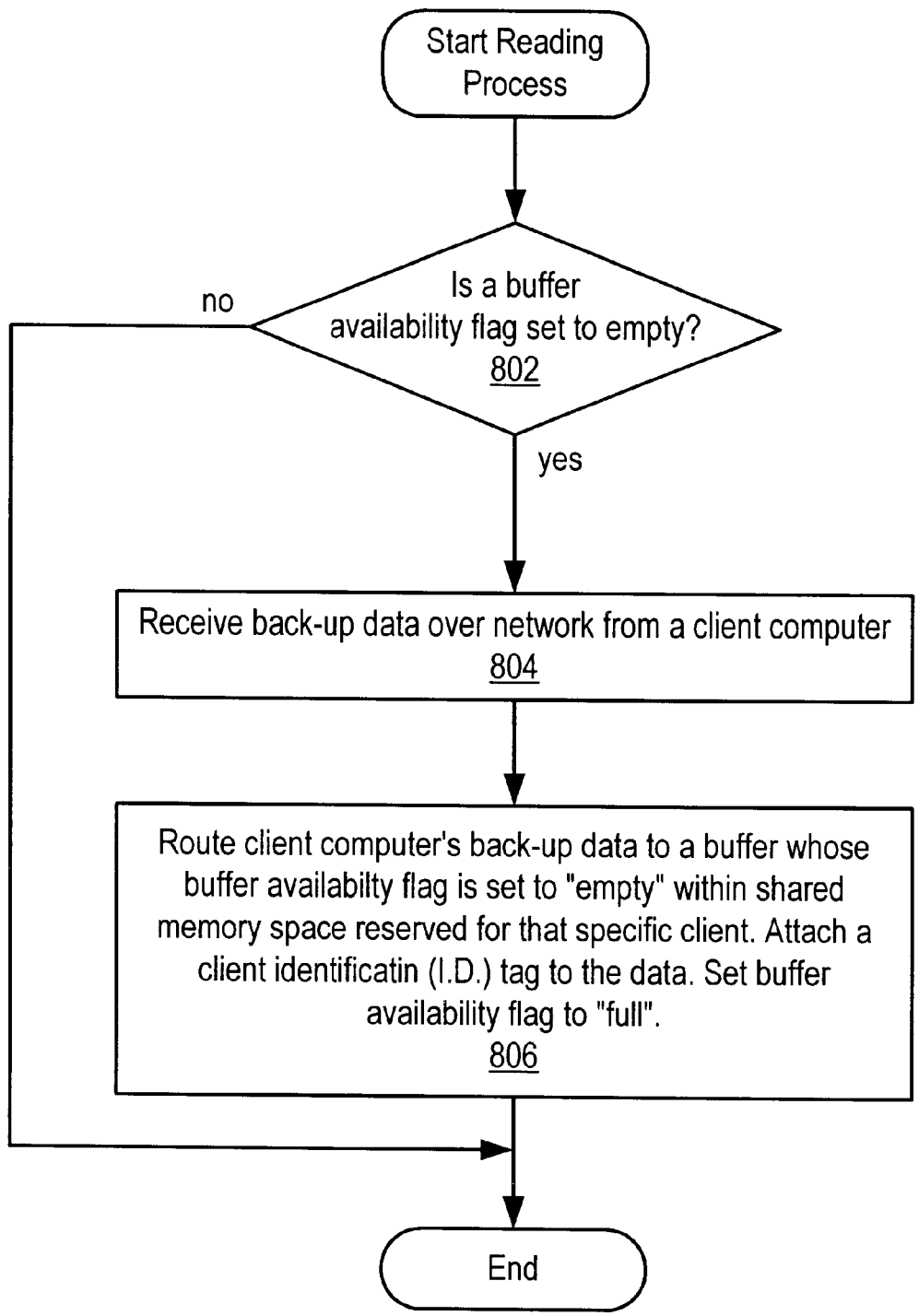
FIG. 8 is a flowchart of a method for reading back-up data.

FIG. 8 is a flowchart of a method for reading back-up data. The method begins in step 802 where if the reading process 506 determines that a buffer availability flag is set to empty, the method proceeds to step 804, otherwise the method ends. Next, in step 804, the reading process 506 receives back-up data over the network 110 from a client computer 102, 112, 118. In step 806, the reading process 506, first, routes the client computer's 102, 112, 118 back-up data to a buffer within a memory block 302, 308, 310 who's buffer availability flag is set to "empty," second, attaches a client identification (ID) tag 402 to the back-up data, and third, sets the buffer availability flag to "full." After step 806 the reading process is complete.

Figure 9:
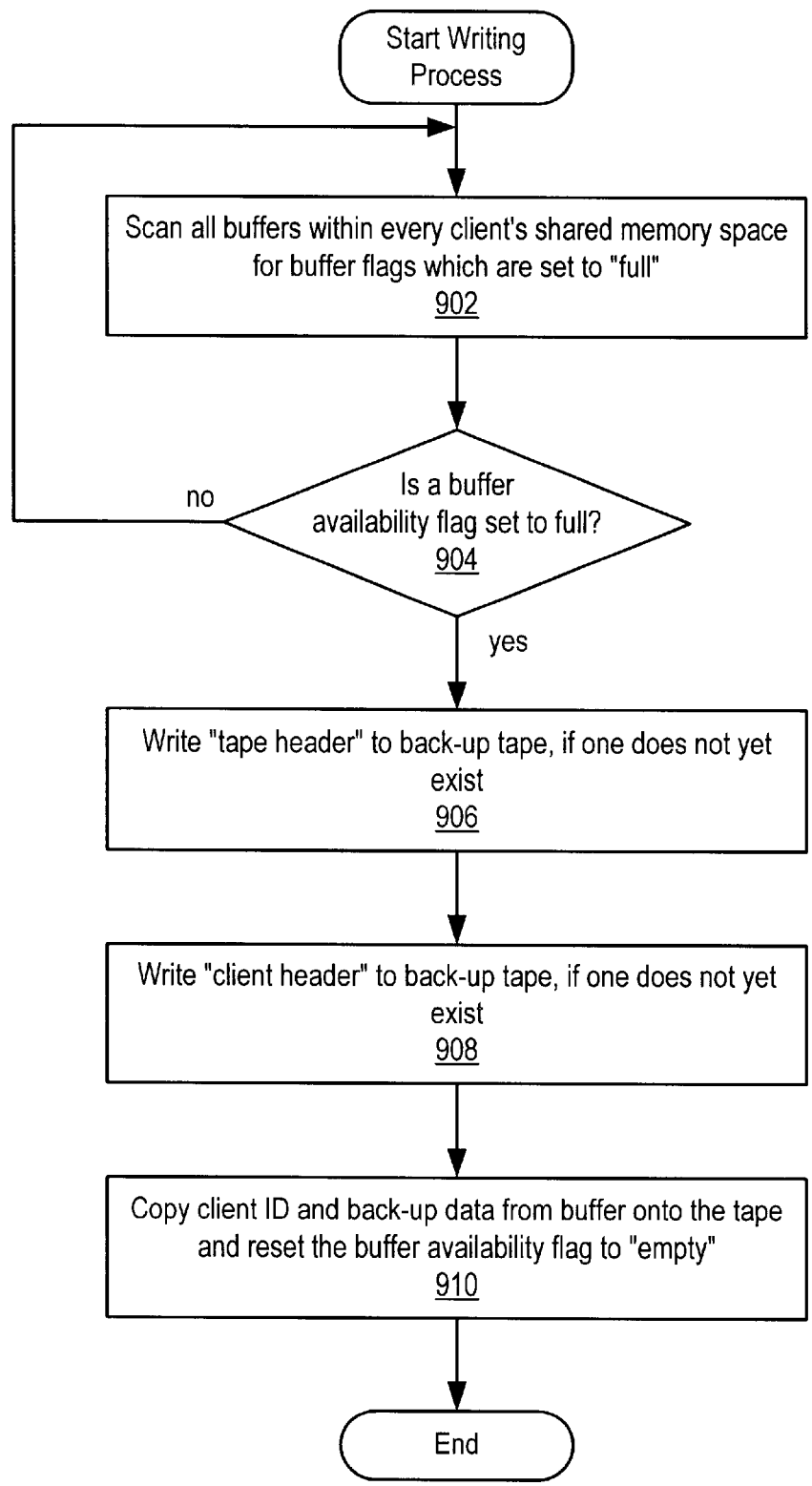
FIG. 9 is a flowchart of a method for writing back-up data.

FIG. 9 is a flowchart of a method for writing back-up data. The method begins in step 902 where the writing process 508 within the back-up tape manager (BPTM) 504 scans all of the buffers within each of the memory blocks 302, 308, 310 looking for buffer availability flags which are set to "full." In step 904, if a buffer availability flag is set to "fill" the method proceeds to step 906, else the method returns to step 902. In step 906, the writing process 508 writes a "tape header" 602 to the tape in a tape drive 128, 130, if one does not yet exist. The tape header contains a conventional set of information associated with putting data onto a tape. In step 908, the writing process 508 writes a "client (back-up) header" 604, 606, 624 to the tape, if one does not yet exist. In step 910, the writing process 508 copies the client identification tag 402 and the back-up data 404 from the buffer onto the tape and resets the buffer availability flag to "empty." After step 910 the writing process is complete.

Figure 10:
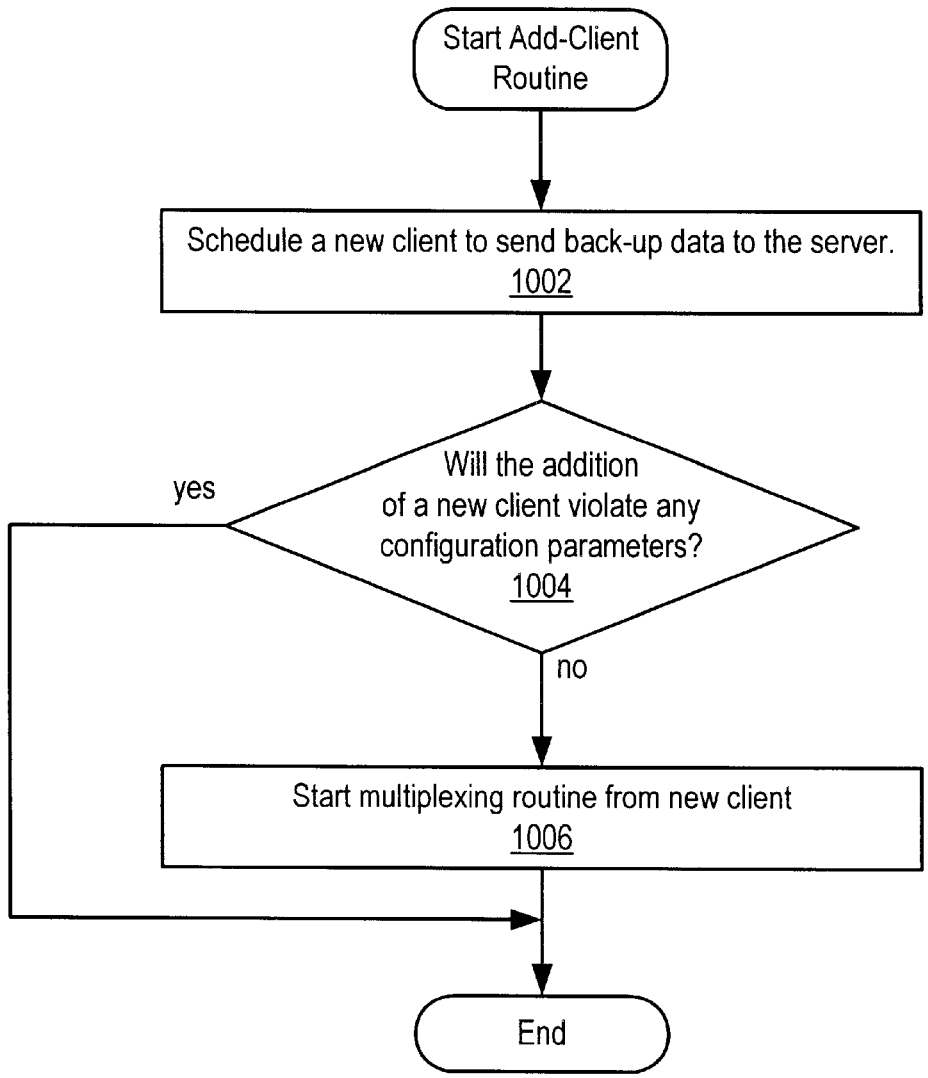
FIG. 10 is a flowchart of a method for adding a new client computer to the multiplexed data back-up process.

FIG. 10 is a flowchart of a method for adding a new client computer 102, 112, 118 to the multiplexed data back-up process. The method begins in step 1002 where the back-up scheduler 502 schedules a new client computer to send back-up data to the server computer 108. Next, in step 1004, the back-up scheduler 502 queries the back-up scheduler unit 502 to determine whether the addition of a new client computer will violate any of the configuration parameters. If there will be a violation the preferred method ends, else it proceeds to step 1006. In step 1006 the BPTM 504 begins multiplexing back-up data from the new client computer onto one of the tapes in a tape drive 128, 130. After step 1006 the preferred method ends.

Figure 11:
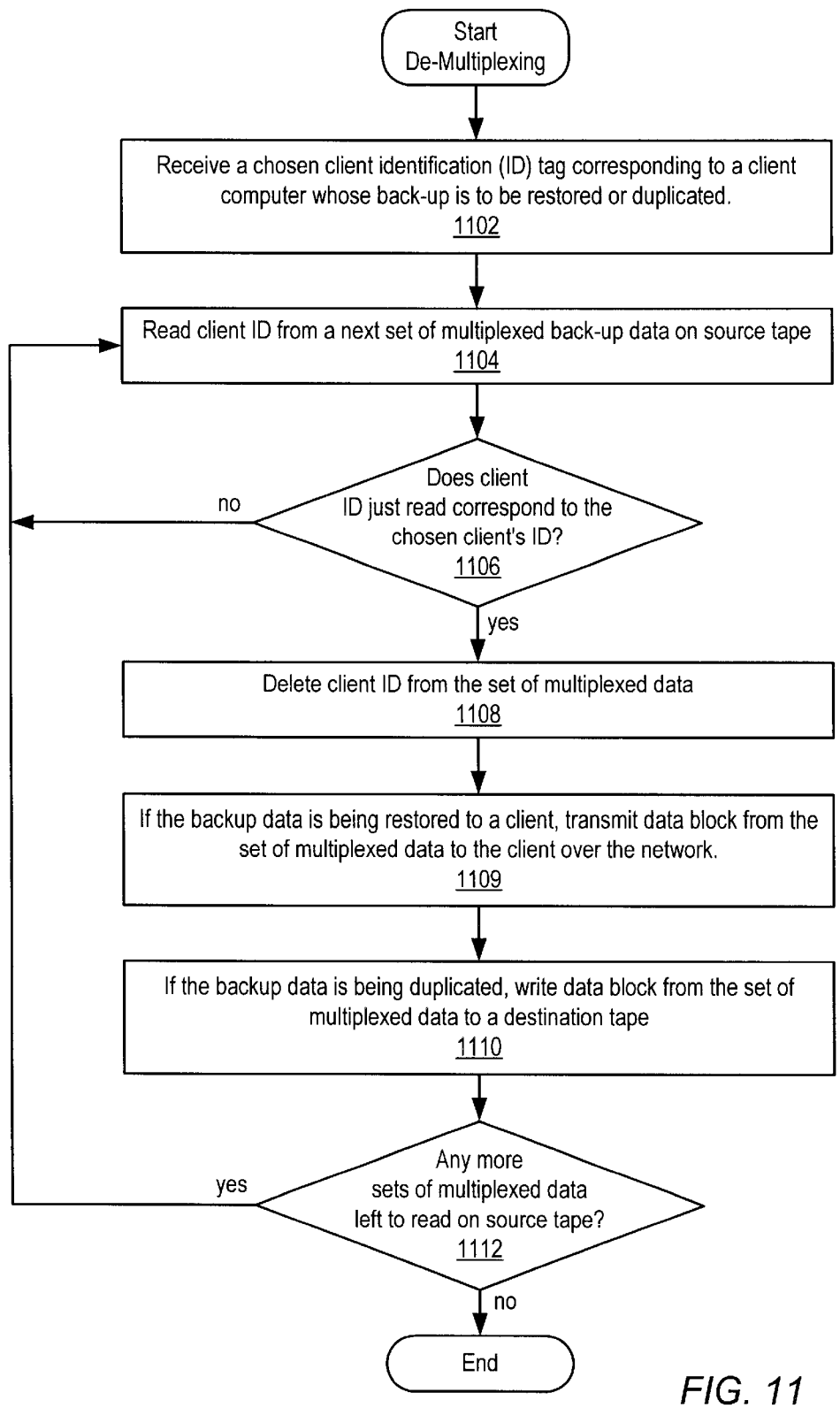
FIG. 11 is a flowchart of a method for de-multiplexing data from a multiplexed back-up tape.

FIG. 11 is a flowchart of a method for de-multiplexing data from a multiplexed back-up tape. The method begins in step 1102 where de-multiplexing process 510 receives a chosen client ID tag corresponding to a client computer 102, 112, 118 who's back-up data is to be either restored to the client computer 102, 112, 118 or duplicated to a destination tape. In step 1104 the de-multiplexing process 510 reads a client ID tag 610 from a next set of multiplexed data 608 stored on a source tape. In step 1106, if the de-multiplexing process 510 determines that the chosen client ID tag corresponds to the client ID tag 610 just read from the source tape, then the method proceeds to step 1108, else the method returns to step 1104. In step 1108 the de-multiplexing process 510 deletes the client ID tag 610 from the set of multiplexed data 608. In step 1109, if the back-up data is being restored to a client computer, the de-multiplexing process 510 transmits the data block 612 from within the set of multiplexed data 608 to the client computer 102, 112, 118 over the network 110. In step 1110, if the back-up data is being duplicated, the de-multiplexing process 510 writes the data block 612 from within the set of multiplexed data 608 to a destination tape. In step 1112, the de-multiplexing process 510 checks to see whether there are any more sets of multiplexed data left to read from the source tape. If there are, the method returns to step 1104, else the method ends.

While the present invention has been described with reference to certain preferred embodiments, those skilled in the art will recognize that various modifications may be provided. Variations upon and modifications to the preferred embodiments are provided for by the present invention, which is limited only by the following claims.

What is claimed is:

1. A computer system comprising:
   a plurality of client computer systems;
   a server computer coupled to said plurality of client computer systems; and
   a storage unit including one or more storage devices coupled to said server computer;
   wherein said server computer includes a plurality of processes each configured to receive back-up data from a respective one of said plurality of client computer systems, wherein said server computer is further configured to store said back-up data to said storage unit;
   wherein said server computer includes a memory, wherein said server computer is configured to allocate a respective portion of said memory to each of said plurality of client computer systems and wherein each of said respective portions of said memory includes a plurality of buffer locations for storing said back-up data received from said respective one of said plurality of client computer systems; and
   wherein said server computer is further configured to allocate another portion of said memory as a plurality of availability flags, wherein each of said plurality of availability flags is indicative of whether a corresponding buffer location has new back-up data and is full.

2. The computer system as recited in claim 1, wherein each of said plurality of client computer systems is configured to execute a back-up process in response to being initialized by said server computer, wherein said back-up process includes reading back-up data from a local storage and sending that back-up data to said server computer in response to that back-up data being read from said local storage.

3. The computer system as recited in claim 1, wherein said plurality of processes are reading processes, wherein each reading process is configured to concurrently monitor a network for back-up data packets including said back-up data with which each reading process is associated, wherein said network is coupled between said plurality of client computer systems and said server computer.

4. The computer system as recited in claim 3, wherein in response to receiving said back-up data packets, each reading process is further configured to create a client identification tag that identifies to which of said plurality of client computer systems each of said back-up data packets belongs.

5. The computer system as recited in claim 4, wherein in response to receiving said back-up data packets, each reading process is further configured to find an empty buffer location within a corresponding one of said plurality of buffer locations using said availability flags and to store a given one of said back-up data packets and a corresponding client identification tag within said empty buffer location and to cause a corresponding availability flag to indicate that said empty buffer location has been filled.

6. The computer system as recited in claim 4, wherein said server computer is further configured to execute a writing process configured to copy back-up data from ones of said plurality of buffer locations having availability flags that are indicative that said ones of said plurality of buffer locations are full to a given storage device within said storage unit.

7. The computer system as recited in claim 6, wherein said writing process is further configured to stream said back-up data from ones of said plurality of buffer locations to said given storage device within said storage unit while said availability flags indicate that any of said plurality of buffer locations have new back-up data.

8. The computer system as recited in claim 4, wherein said server computer is further configured to execute a de-multiplexing process configured to, in response to receiving a particular client identification tag, restore said back-up data by retrieving back-up data associated with said particular client identification tag from said storage unit and to cause said back-up data associated with said particular client identification tag to be written to one of said plurality of client computer systems matching said particular client identification tag.

9. The computer system as recited in claim 8, wherein said de-multiplexing process is further configured to write back-up data associated with said particular client identification tag retrieved from said storage unit to a different storage device of said storage unit.

10. A method comprising:
a server computer executing a plurality of processes each configured to receive back-up data from a respective one of a plurality of client computer systems; and
storing said back-up data to one or more storage devices within a storage unit;
allocating a respective portion a a memory to each of said plurality of client computer systems and wherein each of said respective portions of said memory includes a plurality of buffer locations for storing said back-up data received from said respective one of said plurality of client computer systems; and
allocating another portion of said memory as a plurality of availability flags, wherein each of said plurality of availability flags is indicative of whether a corresponding buffer location has new back-up data and is full.

11. The method as recited in claim 10 further comprising each of said plurality of client computer systems executing a back-up process in response to being initialized by said server computer, wherein said back-up process includes reading back-up data from a local storage and sending that back-up data to said server computer in response to that back-up data being read from said local storage.

12. The method as recited in claim 10, wherein said plurality of processes are reading processes, each concurrently monitoring a network for back-up data packets including said back-up data with which each reading process is associated wherein said network is coupled between said plurality of client computer systems and said server computer.

13. The method as recited in claim 12 further comprising, in response to receiving said back-up data packets, each reading process creating a client identification tag that identifies to which of said plurality of client computer systems each of said back-up data packets belongs.

14. The method as recited in claim 13 further comprising, in response to receiving said back-up data packets, finding an empty buffer location within a corresponding one of said plurality of buffer locations using said availability flags and storing said back-up data and a corresponding client identification tag within said empty buffer location and causing said availability flag to indicate that said buffer location is full.

15. The method as recited in claim 13 further comprising said server computer executing a writing process for copying back-up data from ones of said plurality of buffer locations having availability flags that are indicative that said ones of said plurality of buffer locations are full to a given storage device within said storage unit.

16. The method as recited in claim 15 further comprising said server computer streaming said back-up data from ones of said plurality of buffer locations to said given storage device within said storage unit while said availability flags indicate that any of said plurality of buffer locations have new back-up data.

17. The method as recited in claim 13 further comprising said server computer executing a de-multiplexing process for, in response to receiving a particular client identification tag, restoring said back-up data by retrieving back-up data associated with said particular client identification tag from said storage unit and causing said back-up data associated with said particular client identification tag to be written to one of said plurality of client computer systems matching said particular client identification tag.

18. The method as recited in claim 17 further comprising writing back-up data associated with said particular client identification tag retrieved from said storage unit to a different storage device of said storage unit.

19. A computer readable medium including program instructions, wherein the program instructions are executable by a processor to:
execute a plurality of processes each configured to receive back-up data from a respective one of a plurality of client computer systems; and
store said back-up data to one or more storage devices within a storage unit;
allocate a respective portion of a memory to each of said plurality of client computer systems; and allocate another portion of said memory as a plurality of availability flags, wherein each of said plurality of availability flags is indicative of whether a corresponding buffer location has new back-up data and is full.

20. The computer readable medium as recited in claim 19, wherein said plurality of processes are reading processes, each concurrently monitoring a network for back-up data packets including said back-up data with which each reading process is associated, wherein said network is coupled between said plurality of client computer systems and a server computer.

21. The computer readable medium as recited in claim 20, wherein in response to receiving said back-up data packets, each reading process is configured to create a client identification tag that identifies to which of said plurality of client computer systems each of said back-up data packets belongs.

22. The computer readable medium as recited in claim 21, wherein in response to receiving said back-up data packets, each reading process is configured to find an empty buffer location within a corresponding one of said plurality of buffer locations using said availability flags, to store a given one of said back-up data packets and a corresponding client identification tag within said empty buffer location and to cause a corresponding availability flag to indicate that said empty buffer location has been filled.

23. The computer readable medium as recited in claim 21, wherein the program instructions are further executable by said processor to execute a writing process configured to copy back-up data from ones of said plurality of buffer locations having availability flags that are indicative that said ones of said plurality of buffer locations are full to a given storage device within said storage unit.

24. The computer readable medium as recited in claim 23, wherein said writing process is further configured to stream said back-up data from ones of said plurality of buffer locations to said given storage device within said storage unit while said availability flags indicate that any of said plurality of buffer locations have new back-up data.

25. The computer readable medium as recited in claim 21, wherein the program instructions are further executable by said processor to execute a de-multiplexing process configured to, in response to receiving a particular client identification tag, restore said back-up data by retrieving back-up data associated with said particular client identification tag from said storage unit and to cause said back-up data associated with said particular client identification tag to be written to one of said plurality of client computer systems matching said particular client identification tag.

26. The computer readable medium as recited in claim 25, wherein said de-multiplexing process is further configured to write back-up data associated with said particular client identification tag retrieved from said storage unit to a different storage device of said storage unit.

* * * * *